United States Patent
Fein et al.

(10) Patent No.: US 12,132,801 B2
(45) Date of Patent: *Oct. 29, 2024

(54) SYSTEM AND METHOD FOR REMOTE CROSS PLATFORM PORTABLE SIMULCAST NETWORK

(71) Applicant: CUFER ASSET LTD. L.L.C., Wilmington, DE (US)

(72) Inventors: Gene S. Fein, Lenox, MA (US); Edward Merritt, Lenox, MA (US)

(73) Assignee: CUFER ASSET LTD. L.L.C., Wilmington, DE (US)

(*) Notice: Subject to any disclaimer, the term of this patent is extended or adjusted under 35 U.S.C. 154(b) by 0 days.

This patent is subject to a terminal disclaimer.

(21) Appl. No.: 18/330,788

(22) Filed: Jun. 7, 2023

(65) Prior Publication Data
US 2024/0048639 A1 Feb. 8, 2024

Related U.S. Application Data

(63) Continuation of application No. 17/889,739, filed on Aug. 17, 2022, now Pat. No. 11,711,444, which is a (Continued)

(51) Int. Cl.
*H04L 12/00* (2006.01)
*G06F 16/44* (2019.01)
(Continued)

(52) U.S. Cl.
CPC ............ *H04L 67/567* (2022.05); *G06F 16/44* (2019.01); *G06F 16/954* (2019.01);
(Continued)

(58) Field of Classification Search
CPC . H04L 67/567; H04L 41/5054; H04L 41/509; H04L 41/502; H04L 67/06; H04L 67/56; G06F 16/44; G06F 16/954
(Continued)

(56) References Cited

U.S. PATENT DOCUMENTS

| 5,721,948 A | 2/1998 | Duncan |
| 6,868,403 B1 | 3/2005 | Wiser et al. |

(Continued)

FOREIGN PATENT DOCUMENTS

EP 1274245 1/2003

OTHER PUBLICATIONS

Content Server/simulcast (Year:2013).
(Continued)

*Primary Examiner* — Frantz Coby
(74) *Attorney, Agent, or Firm* — Schwabe, Williamson & Wyatt, P.C.

(57) ABSTRACT

Disclosed is a method and system for a single broadband portal where all content may be delivered to users of varied electronic devices. An example embodiment (i) provides a user interface for enabling user selection of media contents per varied electronic devices, each varied electronic device having a respective platform, the user interface indicating one or more different possible media contents; (ii) accepts from a user requests for distribution service to any of the varied electronic devices of the user, the requests specifying a user desired media content; (ii) locates the user desired media content from a plurality of storage modules; (iv) transmits the user desired media content to at least one of the varied electronic devices of the user; and (v) tracks the transmission of the user desired media content for billing purposes.

20 Claims, 9 Drawing Sheets

Related U.S. Application Data continuation of application No. 16/511,317, filed on Jul. 15, 2019, now Pat. No. 11,431,818, which is a continuation of application No. 11/618,014, filed on Dec. 29, 2006, now Pat. No. 10,356,195.

(51) Int. Cl.
  *G06F 16/954* (2019.01)
  *H04L 41/50* (2022.01)
  *H04L 41/5054* (2022.01)
  *H04L 67/06* (2022.01)
  *H04L 67/56* (2022.01)
  *H04L 67/567* (2022.01)

(52) U.S. Cl.
  CPC ........ *H04L 41/5054* (2013.01); *H04L 41/509* (2013.01); *H04L 67/06* (2013.01); *H04L 67/56* (2022.05); *H04L 41/5029* (2013.01)

(58) Field of Classification Search
  USPC .................................. 709/201, 204; 707/723
  See application file for complete search history.

(56) References Cited

U.S. PATENT DOCUMENTS

| | | |
|---|---|---|
| 7,076,467 B1 | 7/2006 | Chantani |
| 7,308,413 B1 | 12/2007 | Tota et al. |
| 10,127,297 B2 * | 11/2018 | Bharadwaj .............. G06F 16/27 |
| 10,356,195 B2 * | 7/2019 | Fein ....................... G06F 16/954 |
| 10,448,070 B2 | 10/2019 | Qian |
| 10,572,117 B2 | 2/2020 | Scott et al. |
| 11,115,373 B1 * | 9/2021 | Kakumanu ............. H04L 51/42 |
| 11,375,004 B2 | 6/2022 | Chiussi et al. |
| 11,431,818 B2 * | 8/2022 | Fein ..................... H04L 41/509 |
| 11,711,444 B2 * | 7/2023 | Fein .................... H04L 41/5054 707/723 |
| 2003/0014630 A1 | 1/2003 | Spencer |
| 2003/0236920 A1 * | 12/2003 | Harris ................. G06F 13/4022 709/253 |
| 2004/0243700 A1 | 12/2004 | Weast |
| 2005/0028391 A1 | 12/2005 | McCarthy et al. |
| 2006/0161635 A1 | 7/2006 | Amkin et al. |
| 2007/0153776 A1 | 7/2007 | Joseph |
| 2007/0220025 A1 | 9/2007 | Hyman |
| 2008/0052415 A1 | 2/2008 | Kellerman |
| 2010/0185732 A1 | 7/2010 | Hyman |
| 2020/0014771 A1 | 1/2020 | Fein |
| 2021/0392107 A1 * | 12/2021 | Kakumanu ........... H04L 51/046 |
| 2023/0118108 A1 * | 4/2023 | Kakumanu ............. H04L 51/56 709/206 |

OTHER PUBLICATIONS

International Searching Authority USPTO; International Search Report for International Application No. PCT/US2007/086423; May 27, 2008; 4 pages.

\* cited by examiner

SYSTEM AND METHOD FOR REMOTE CROSS PLATFORM PORTABLE SIMULCAST NETWORK

CROSS-REFERENCE TO RELATED APPLICATIONS

This Application is a Continuation of application Ser. No. 17/889,739 filed on Aug. 17, 2022, which is a Continuation of application Ser. No. 16/511,317 filed on Jul. 15, 2019, which is a Continuation of application Ser. No. 11/618,014 filed on Dec. 29, 2006, which are hereby incorporated by reference in their entireties.

BACKGROUND OF THE INVENTION

It is well known that content rights holders license their content to different broadcasters and exhibitors. Many times those content rights license holders also license out their rights in parcels across different media platforms such as theatrical, wireless, retail, pay per view, online as well as parceled domestic and international rights. Generally speaking, the term "platform" encompasses the underlying system and standards that are used to provide a particular service. The platform refers to the combination of standards that provide the operating environment for the specific service. The platform may specify an Application Programming Interface (API) that provides functions or conventions by which the application accesses lower-level services. Media platform may be a digitized platform for media that allows real-time and/or delayed delivery of video, audio and/or data to multiple networks such as telco, cable, satellite, digital terrestrial broadcasting and broadband. Delivery can be made via a variety of devices possibly including mobile phones, set-top boxes, PDAs and computers. Often the content can be produced generically, eliminating the need for platform-specific content production tools.

Currently, several models exist that have distributors of certain media rights exercising the right to distribute licensed content across one or more bargained for media platforms. There are scores of media distributors distributing millions of pieces of content, from ring tones, to films, to television, radio programs to computer software covering both cached programming and live events. Some distributors may be solely focused on distributing a certain type of content for certain devices. For instance, there are some distributors who distribute only ring tones to certain cell phone service providers and only to certain compatible cell phones. There are also many distributors who distribute to multiple formats such as brick and mortar retailers, wireless service providers and digital online distribution services. The range and breadth of distribution reach and content carried, both licensed and unlicensed content, by specific distributors, runs the gamut.

Conventional models have different distributors parsing out software, free radio, pay radio, pay per view (PPV) or video on demand (VOD), cable & broadcast rights and multimedia online content to different exhibitors and, in some cases, the content originator, distributor and exhibitor may be the same entity. The result is that of the millions of available pieces of available content, only music distributors who sell individual songs aggregate over a million possible content size kind units (skus) for purchase from the tens of millions of existing skus available to the market place for possible purchase.

Unfortunately, this has created a fragmented marketplace where it is currently impossible to go to one source to fill the content needs for all of ones electronic devices.

Accordingly, there is a need for a single broadband portal where all content may be delivered to users of varied electronic devices. As rights to such content are in the hands of multiple content providers, distributors and exhibitors, there must be a substantial amount of cross licensing and shared distribution to enable one interface to deliver all of this content across multiple formats to multiple devices.

SUMMARY OF THE INVENTION

The present invention relates to a multi media on demand service that enables audio only as well as audiovisual programming to be distributed to a wide range of portable devices and billed through a variety of systems. The service centralizes existing on demand services and transacts business with those services as an intermediary delivering a wide range of content to a wide range of devices via numerous device codec (compressor-decompressor, coder-decoder, or compression/decompression encoding) compatibilities built into the system. The service enables premium a la carte ordering for consumers enabling any sort of content to be delivered to fit any desired purpose from viewing full length films to receiving the audio for a ballgame in a crowded establishment where the game is on the establishment television but the audio cannot be heard.

In a preferred embodiment is a method and system that (i) provides a user interface for enabling user selection of media contents per varied electronic devices, each varied electronic device having a respective platform, the user interface indicating one or more different possible media contents; (ii) accepts from a user requests for distribution service to any of the varied electronic devices of the user, the requests specifying a user desired media content; (ii) locates the user desired media content from a plurality of storage modules; (iv) transmits the user desired media content to at least one of the varied electronic devices of the user; and (v) tracks the transmission of the user desired media content for billing purposes.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of preferred embodiments of the invention follows.

Figure 1:
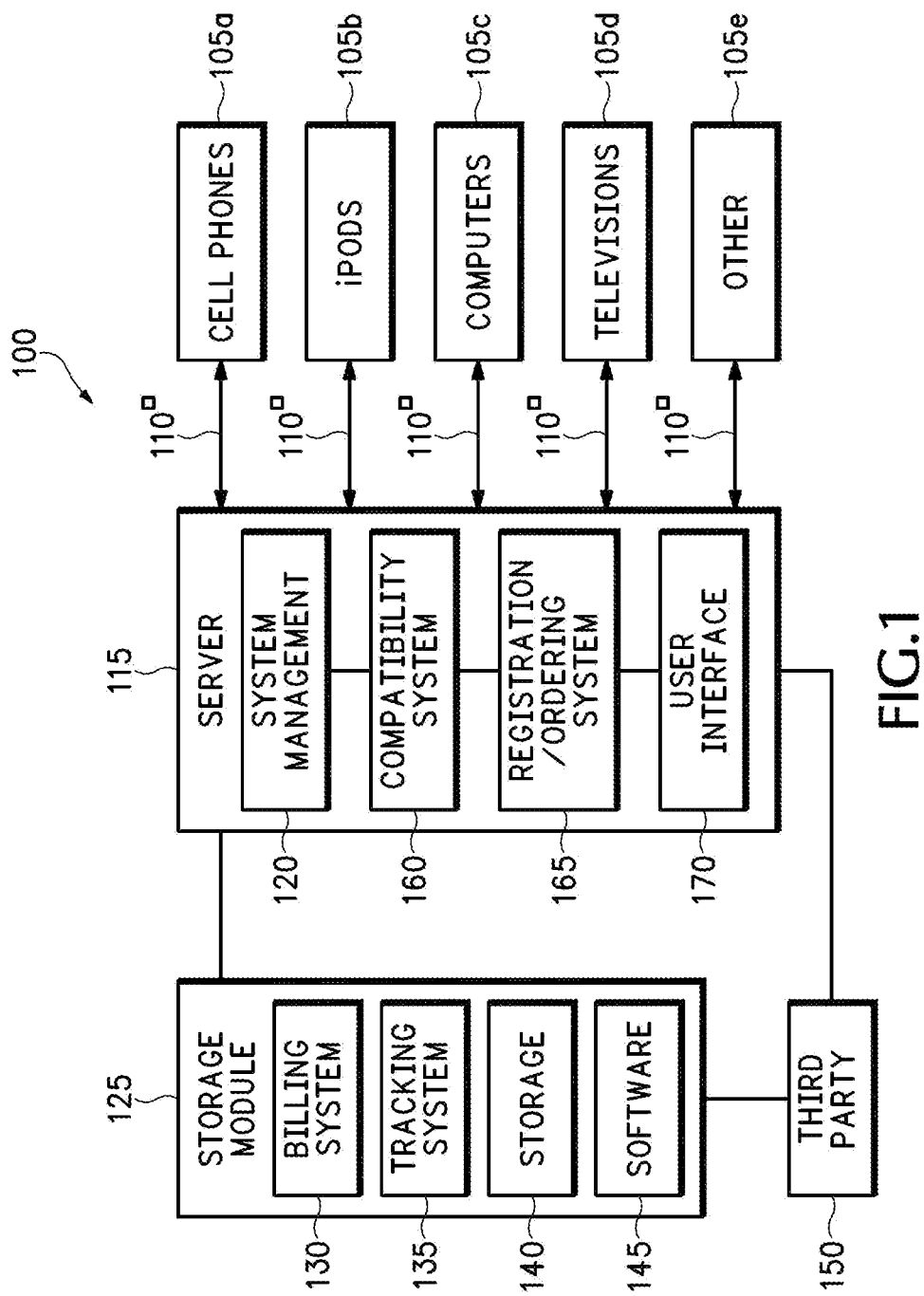
FIG. 1 is a block diagram of an exemplary architecture of a system embodying the present invention along with a range of devices and delivery options to deliver media contents.

FIG. 1 illustrates the basic architecture of the system 100 employing an embodiment of the present invention for delivering media of live or cached content when utilizing a digital simulcast network. The system 100, in one embodiment of the present invention, contemplates the cohesive delivery of multiple media formats to multiple hardware devices. An exemplary system 100 may include a range of electronic devices having different platforms such as cell phones 105a, digital music players (iPods) 105b, computers 105c, televisions 105d, and other different delivery methods 105e, server 105, storage module 125, and third party module 150. The other different delivery methods 105e may be in different codecs designed & programmed for compatibility with different devices. The server 115 may include a system management 120, a compatibility system 160, registration/ordering system 165 and a general user interface 170. The storage module 125 may include a billing system 130, a tracking system 135, data storage 140, and software processor 145.

The system 100 is capable of delivering a wide range of content being available for selection by users of multiple hardware devices 105a-105e. An end user (not shown) utilizing one of the electronic devices 105a-105e having different platforms may send a signal 110 requesting the centralized general user interface 170. The centralized general user interface 170 is linked to a registration/ordering system 165 that enables content to be delivered in multiple formats to electronic devices 105a-105e. The compatibility to deliver to the electronic devices 105a-105e is pre-programmed using the devices API instructions or custom delivery design programming via the hardware devices design elements and installed media player or via the downloading of a separate player application and general user interface software application.

The variety of media content available for selection via the general user interface 170 for the network may include music, ring tones, feature films, live and cached television programs, software programs and applications, radio programs and other textual, graphical, audio, video and audio-visual content. The general user interface 170 may also be custom branded for distribution, hardware or content partners. The individual electronic devices 105a-105e may run software interfaces that are programmed to work with the capabilities of the device. For instance, if certain portable devices do not play video content, then only textual and audio content options will appear on the interface, which may be updated later via download to accommodate an upgraded device that now accepts video. Different interfaces will also require different download options via a menu selection to download the right interface for the right device. Specific interfaces may suit the screen size, functionality, technical and billing demands of the device, network partners and software and content partners. The interface and content download system is also be configured for specific device requirements utilizing the specifications made available by the device API's and compatible software formats such as Pocket PC and Symbian among many others.

Once a request is made for the media content on the general user interface 170, the registration/ordering system 165 verifies the user's account. The compatibility system 160 determines if the media content requested by the end user is compatible with one of the end user's electronic devices 105a-105e. Some media content will not be available because the electronic devices 105a-105e do not support such media content.

The system management 120 enables delivery of the media content and also handle system requests for general user interface downloads or updates (not shown).

The media content may be delivered by the server system 115 via the storage module 125 or via an arrangement with third party content providers 150. The third party content providers 150 may be rights holders contracting with a company, such as Simulcast Network System 100 to provide content to the system 100 in the form of live content as well as cached content and updates. Once the content has been legally contracted for inclusion in the Simulcast Network System 100, the media content is then integrated into the system storage module 125. This includes registration of the content and numbering of the content within the billing system 130 for billing, corresponding tracking system 135 for tracking usage, and storage 140 of the physical content and digitization processes. The software system 145 may also provide software optimization, updates, and downloads.

The media content may be billed and delivered by the billing system 130 as part of the storage module 125 or by an intermediary billing and delivery systems (not shown) instituted by third parties 150 either directly involved in the content, hardware or distribution of certain items serviced by the system 100. The delivery and billing may also be handled by certain third parties 150 with no relationship to any item of content, devices or distribution directly involved in the system 100.

The content may be delivered to multiple electronic devices 105a-105e platforms for broadband television viewing and/or online viewing, as well as for download to cinema quality digital video projection systems and the like. In certain circumstances, multiple electronic devices 105a-105e may share or work in tandem with the downloading and delivery processes as well as the content exhibition. One such example of this would be a laptop or desktop that downloads the content and then passes that content to a digital projection system or a television or other display monitor for exhibition.

Figure 2:
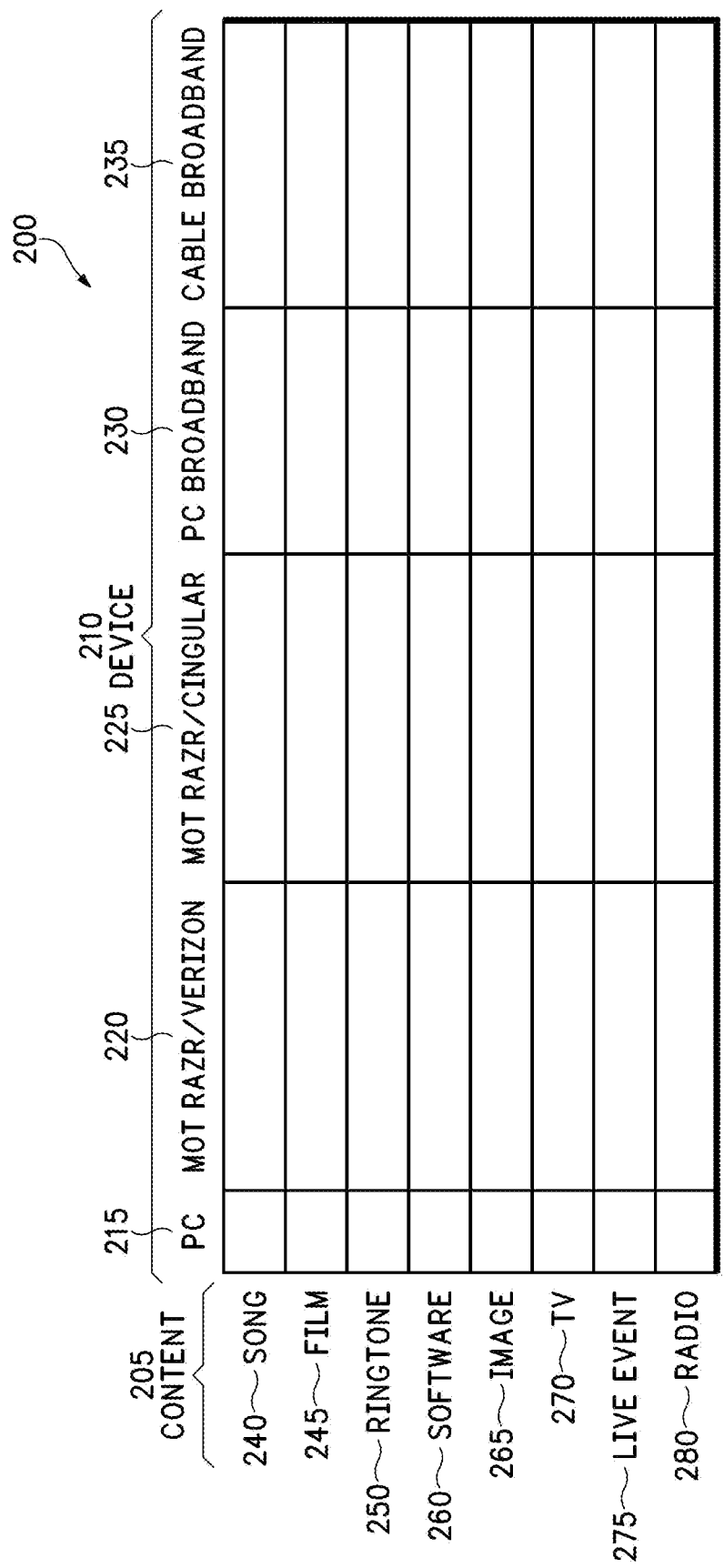
FIG. 2 illustrates a compatibility grid of the present invention that denotes what kind of content may be delivered to specific devices.

FIG. 2 illustrates an exemplary compatibility grid 200 that denotes what kind of content 205 may be delivered to specific electronic devices 210. The content 205 may include song (digital, audio or music) 240, film video 245, ringtone 250, software 260, image 265, television 270, live event 275, and radio 280. The device 210 may include personal computer 215, cellular telephones 220 and 225, personal computer broadband 230, and cable broadband 235. Note that the type of device 210 and content 205 listed here are only examples and should not be read as limitations of the present invention. One type of electronic devices 210 may be cellular mobile telephones. There are hundreds of cellular telephones, such as Verizon Motorola V3 Razr 220 and Cingular Motorola V3 Razr 225, alone that can be on this compatibility grid 200 and then those phones may be further sorted by respective wireless providers hardware & system specifications and operating system. Consequently, some content, such as video content 240, will not be available for delivery via the system 100 to devices that do not support video playback or do not have the storage, memory or the technical specifications to play certain content from the system. The compatibility grid 200 may be utilized in the storage 140 of FIG. 1 to confirm or deny content requests, both to deploy available appropriate content menus for devices and to regulate and confirm that requested content 205 will be possible to transmit, play or be available for storage on a specific devices 210.

Figure 3:
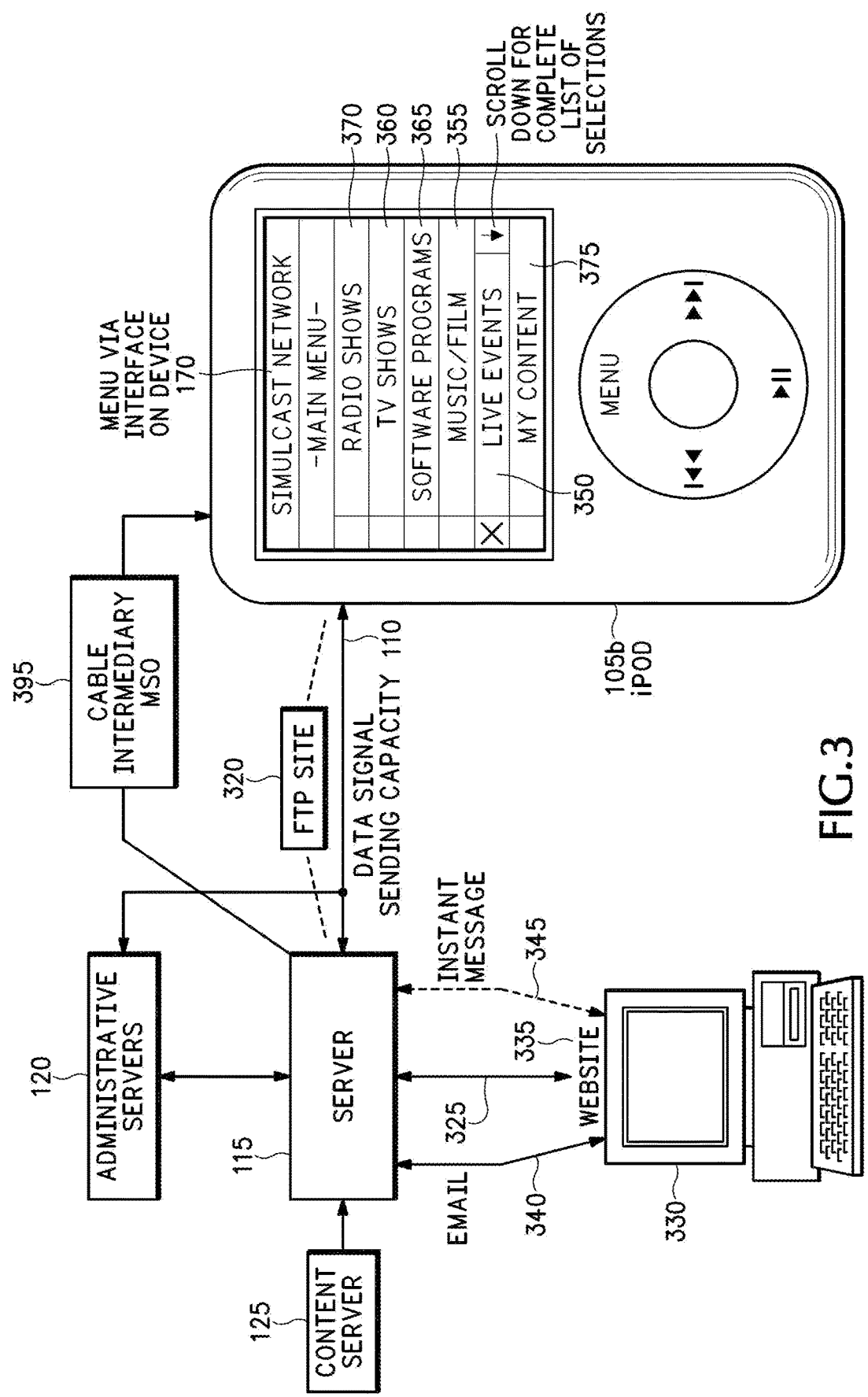
FIG. 3 is a schematic view of a simulcast network menu displayed on a digital music player by the present invention.

FIG. 3 illustrates one version of an electronic device, such as one version of a digital music player 105b, with wireless communication abilities, similar but broader in wireless coverage ability to the Nike iPod for example, displaying a General User Interface (GUI) 170 of the present invention that allows the user to access the remote simulcast network servers 115. Just as the Nike iPod allows for users to receive specialized information about their current running times and pace, by integrating the GUI 170 and data signal sending capacity signal 110 into the digital music player 105b, the user can have the ability to select specific content for delivery to the player 105b. The media content may be delivered directly from the server 115 to the player 105b or from the server 115 to an intermediary FTP site 320 that communicates to the player 105b.

Because the player 105b is currently configured as a 'one-way' device, i.e. content cannot be downloaded to the device and then stored on a separate device, the user may, depending on the rights associated with the specific content involved in delivery to the device, be given the right to simultaneously download the content to an FTP site 320 that can immediately or sometime later be accessed for downloading signal 325 to a personal computer 330 or other storage medium (not shown). In certain circumstances the user may only authorize direct download to a third party device (not shown) or storage medium (not shown), choosing to not download to the instant device 105b. The download to the third party device (not shown) in all instances may be done instantaneously or the download may be cached for later retrieval via password protected access via a website 335, via an FTP site 320 or via a link delivered via email 340 or instant message 345. Other download methods may also be suitable.

The categories for content to be made available on the present invention simulcast network 100 may be displayed on the instant device 105b through interface 170. In the illustrated example, a main menu offers content categories such as Live Events 350 encompassing such offerings as news programs, sports programs, entertainment events, parades and other special events may be one selectable main category. A Music/film 355 menu item encompasses live and cached performances of audio and video from artists performing at large and small venues from across the world or via the delivery of cached musical content. A Television show 360 menu item enables either live or cached episodes to be delivered to the devices including any broadcast programming or broadband materials made available to the network including, but not limited to, clips from sources like Youtube.com and other web sites that make content available for streaming or download. Further, software 365 may be one of the menu items available for download in the system through the menu items. Software 365 may be downloaded centrally or from individual producers, distributors or aggregators like download.com, although the origin point of the content may be invisible to the user who sees a GUI 170 branded to the device or service, content choices, prices, billing options and delivery point options. Radio programming 370 may also be a menu item available similar in design to the software menu item 365 and corresponding downloads.

Rather than just providing a place for two or three kinds of media content, the invention GUI 170 and simulcast and cached media delivery system 100 provide a place for any kind of media to be downloaded or streamed with compensation models in place to reimburse rights holders and channel owners, either via advertising revenue sharing, user payments or a combination thereof. In addition to the foregoing categories of content, a user can make their own content stored on their hard drive at home, such as the personal computer 330 or other storage facility available for download (not shown) to a device 105b within the digital simulcast network 100 infrastructure. This may be done via the user hosting the users own content on their own FTP site 320. FTP site 320 host content may then be served from a selectable menu item, my content 375, on the GUI 170 and either delivered directly to the device 105b, or correctly formatted for the device 105b by a simulcast network central server 115 formatting tool (compatibility system 160) and then sent via the data sending signal 110 to the device 105b.

After a user selects the general category of content on the GUI 170, the user is then presented with corresponding sub-lists and lists of specific named (titled) content to narrow the content choices to the one(s) the user wants. The sub-lists are navigable via finger button scroll or manual scroll which may be circular or wound vertically or the like, depending on the device. Information regarding the user selection and related information may be used in a search mechanism to make recommendations for content based upon prior selections by the user, or based on relations to similar preferences by the community. In some circumstances, content may be presented in a premium access position within the GUI 170 based upon a marketing relationship.

When the user selects or identifies through GUI 170, desired administrative server (part of the system management 120), responds with a data signal 110 indicating to the user with download options and specifications as well as billing terms and acceptance queries. If the user consents to the billing terms then the administrative server 120 directs the content server (of storage module 125) to deliver the user selected content to the desired destination(s) for delivery that coincides with the right to do so by the content provider. The continuity of such delivery is made capable by the present invention interoperability of server 115 and device 105b design.

Delivery of content from the server system 115 by the present invention may be accomplished directly via data signal 110 to a device 105b or through a requesting intermediary 395 such as a cable multiple system operators (MSO) or other third parties 150 or downloading signal 325. Content delivery from the server system 115 may also be conditioned based upon the needs of the receiving device 105b. File quality for a phone will be less than that of a computer screen, which will be less than that of a television. Each device may have respective specific delivery parameters that may be prepared and delivered by the server system 115.

Figure 4:
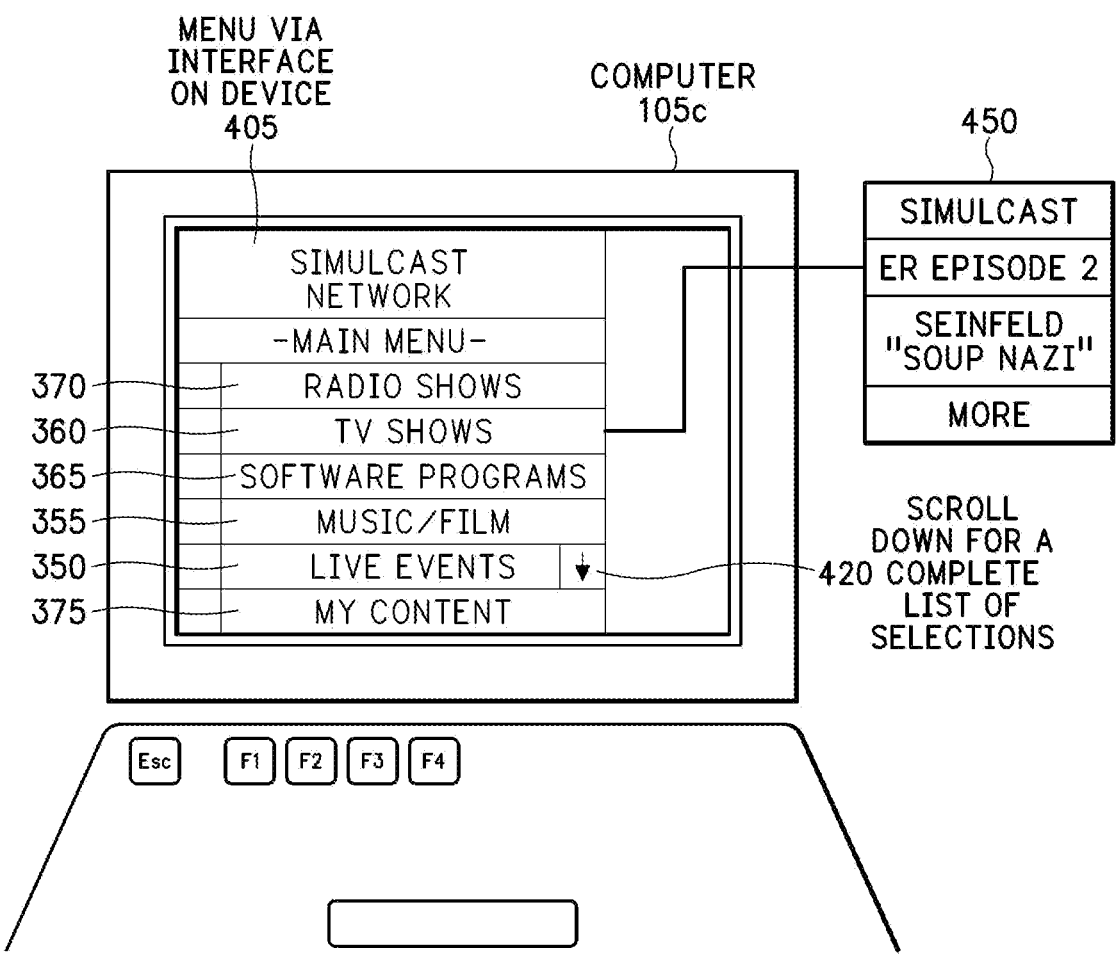
FIG. 4 is a schematic view of a simulcast network menu displayed on a computer by the present invention.

FIG. 4 illustrates the GUI 170 with the addition of the MY Content 375 menu option discussed in FIG. 3, as displayed on a personal computer screen 105c. The menu allows for a simple scroll down 420 and click to select original menu options such as radio shows 370, music or film 355, TV shows 360, software programs 365, live entertainment 350 and the users own original content under the header of My Content 375. User selection of one of these main menu subject headings leads to a submenu 450 of specific content choices in the category of the user selected main Menu subject header 350, 355, 360, 365, 370 and 375.

Figure 5:
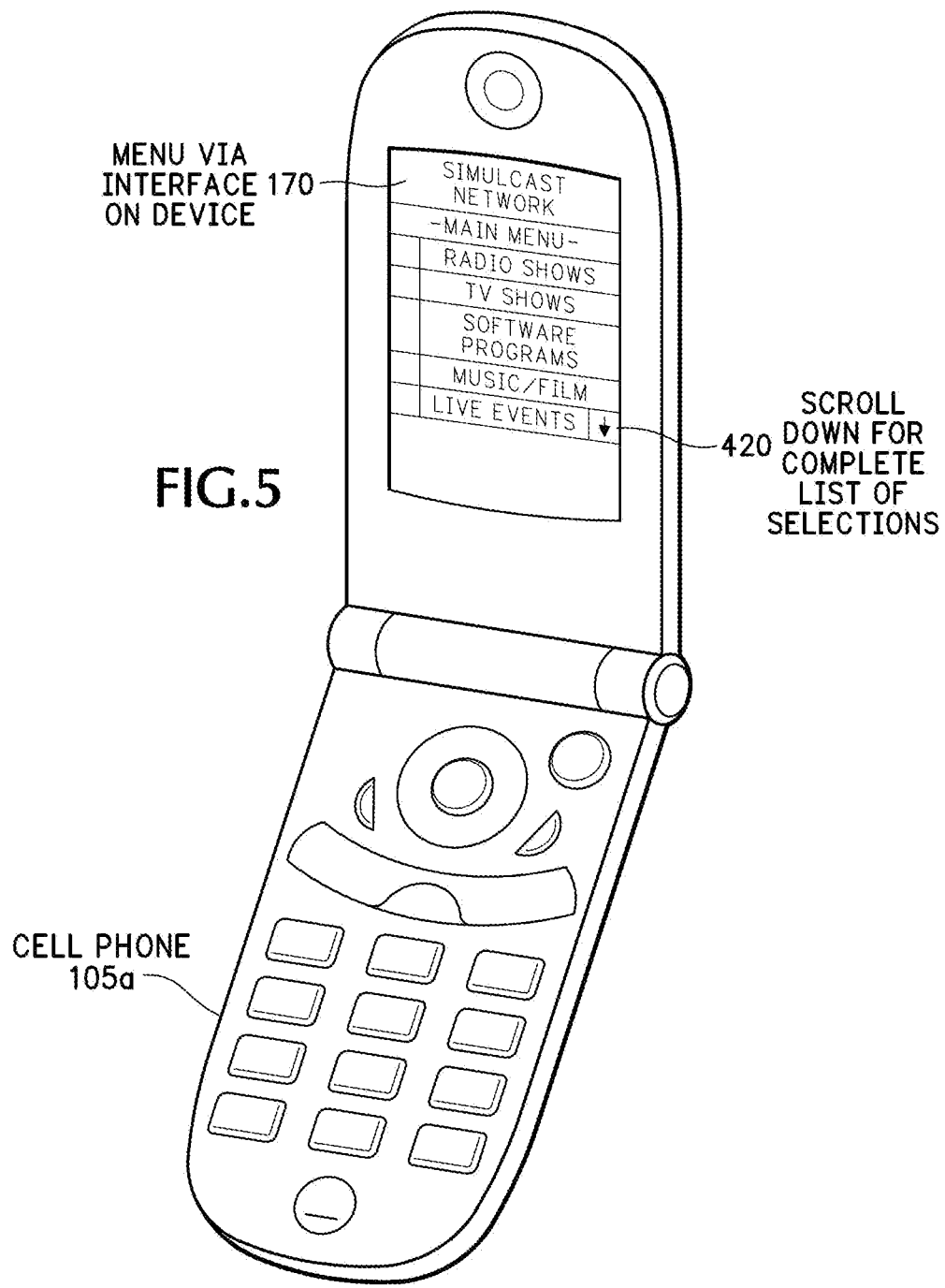
FIG. 5 is a schematic view of a simulcast network menu displayed on a cellular phone by the present invention.

FIG. 5 illustrates a cellular telephone 105a in the present invention with GUI 170 main menu display and scrolling function 420.

Figure 6:
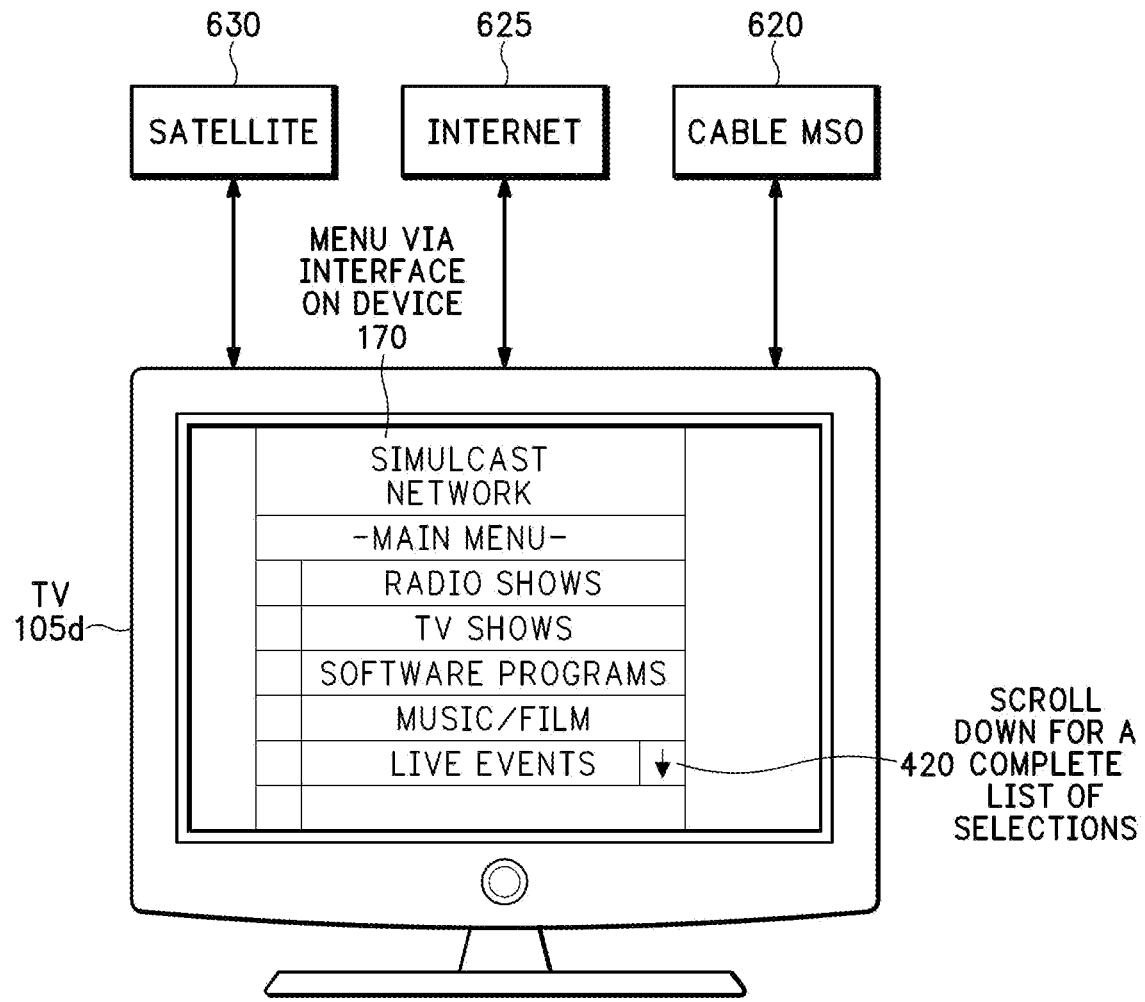
FIG. 6. is a schematic view of a simulcast network menu & a sub menu displayed on a television by the present invention.

FIG. 6 illustrates a television 105d with the GUI 170 main menu display, scroll down navigation 420 and along three possible delivery points. Contents delivery in the television 105d environment menu include (a) cable MSO 620 delivery most likely over a high speed digital cable line (not shown), (b) a direct satellite connection (not shown) or a third party satellite connection 630 service, such as DirecTV, and (c) a global computer network 625. Each of these connections may require a larger program data file to be delivered or transmitted to the television 105d than if the data file was intended for a portable device such as iPod, a digital music player 105b, or cellular phone 105a. By way of example, a full movie file for the iPod Video portable device is 1.1 gigabytes, while a digital versatile disc (DVD) that plays on a television set is approximately 5.5 gigabytes or larger for a long movie or for a high definition volumetric display (HDVD) that displays an HDVD quality film on the TV.

Figure 7:
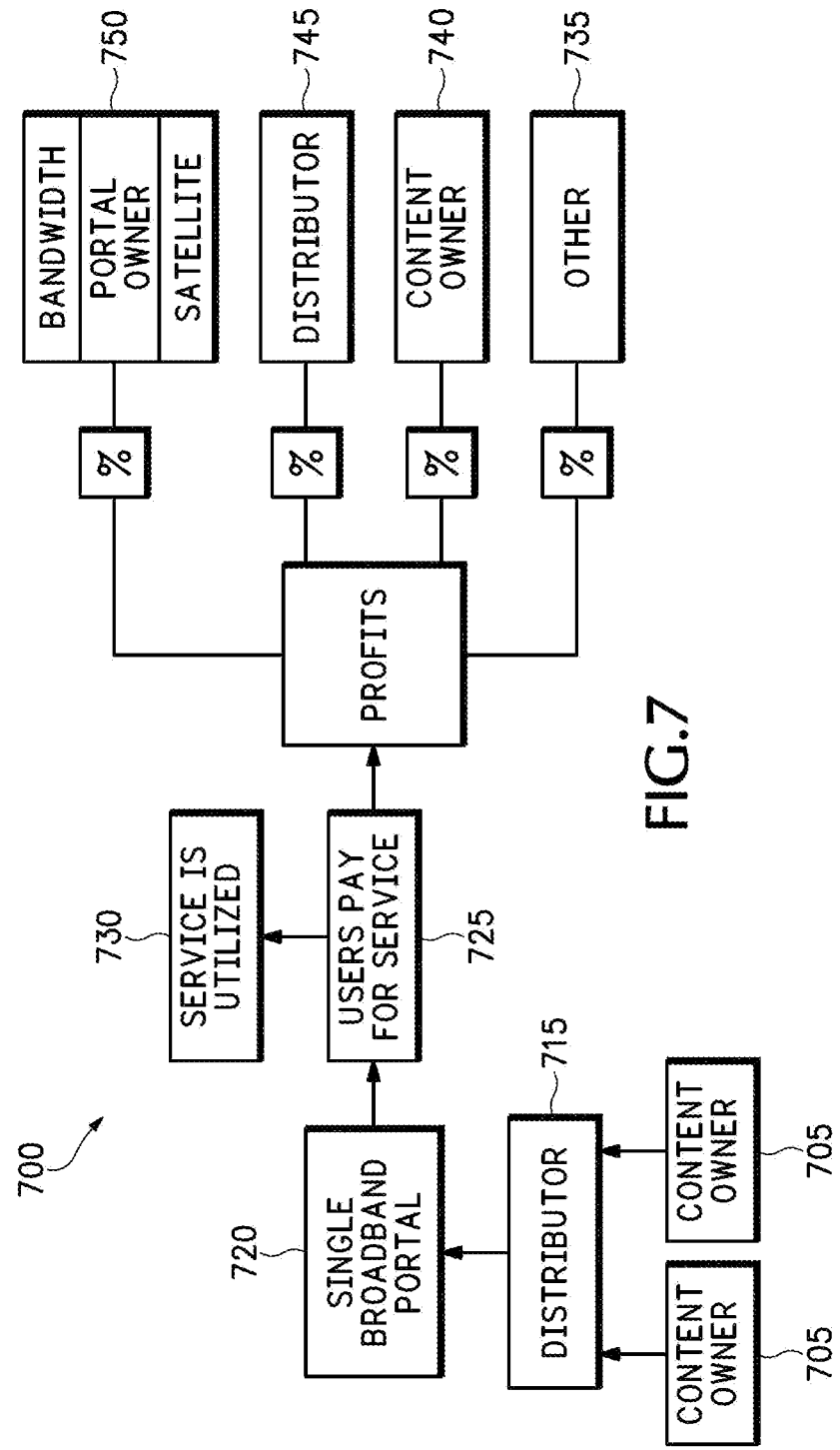
FIG. 7 is a flow chat detailing the compensation model of a simulcast network system of the present invention.

FIG. 7 illustrates the compensation model 700 for the invention system 100. Content owners 705 and distributors 715 provide the content for the system 100 including content that may be owned and controlled by the system operators themselves. The content becomes available with any specific usage rules agreed by the system and the content rights holder(s) under the System portal 720. The users 725 agree to participate in the service, billing, and/or tracking of user activity is generated as the service system is utilized at 730 by the user 725. Revenue and/or profits collected (generated) by the system may then be divided among a number of stakeholders including sub-distributors such as networks, marketing partners, advertising agencies, advertisers or cable MSO's denoted in the Figure as Other 735. Other parties that may be compensated include content owners 740, primary distributors 745 and portal, bandwidth, satellite or website portal owners 750.

Figure 8:
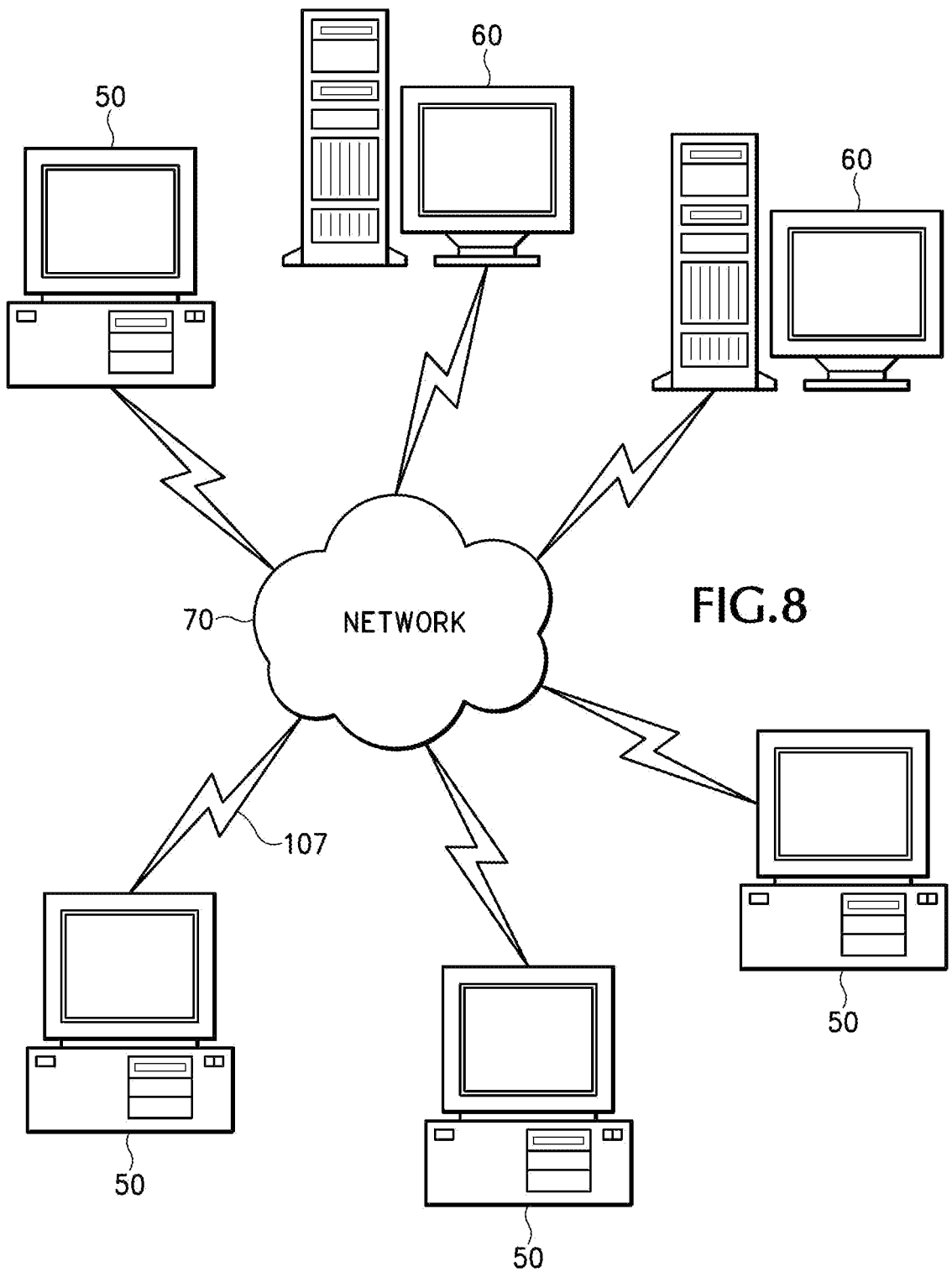
FIG. 8 is a schematic view of a computer environment in which the principles of the present invention may be implemented.

FIG. 8 illustrates a computer network or similar digital processing environment in which the present invention may be implemented.

Client computer(s)/devices 50 and server computer(s) 60 provide processing, storage, and input/output devices executing application programs and the like. Client computer(s)/devices 50 can also be linked through communications network 70 to other computing devices, including other client devices/processes 50 and server computer(s) 60. Communications network 70 can be part of a remote access network, a global network (e.g., the Internet), a worldwide collection of computers, Local area or Wide area networks, and gateways that currently use respective protocols (TCP/IP, Bluetooth, etc.) to communicate with one another. Other electronic device/computer network architectures are suitable.

Figure 9:
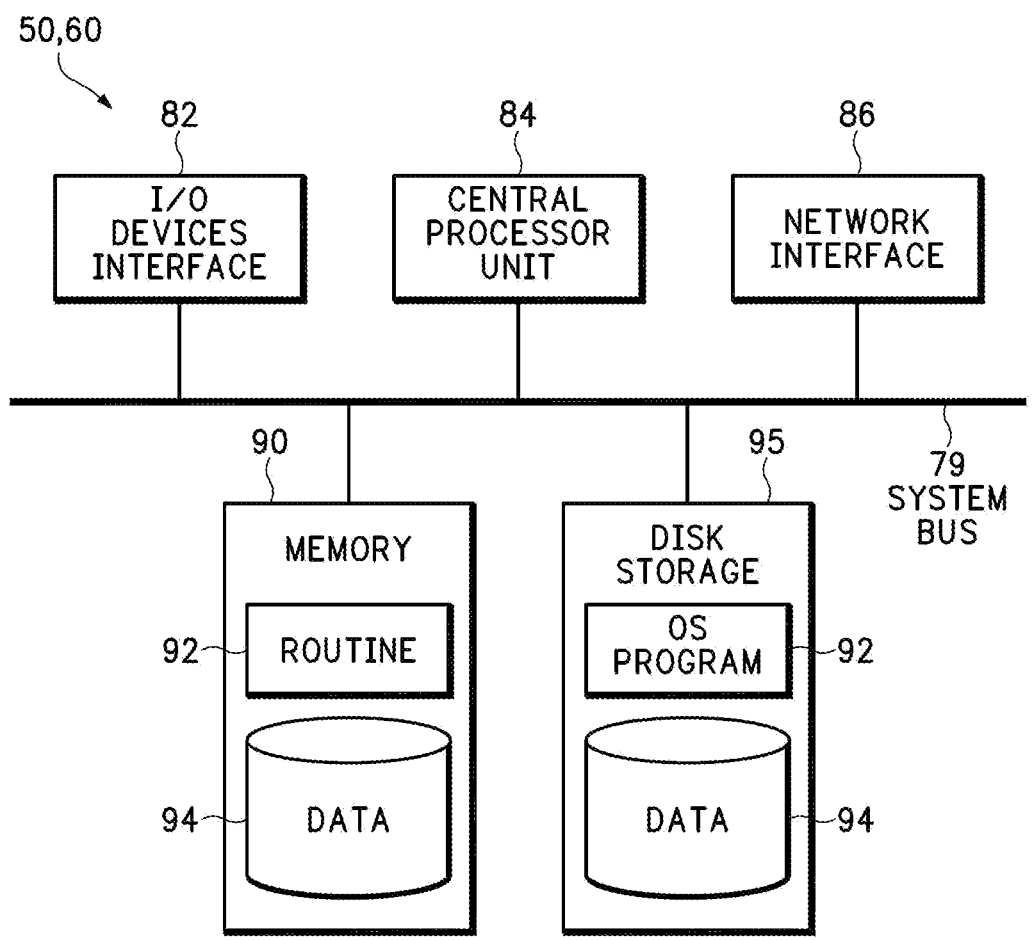
FIG. 9 is a block diagram of the internal structure of a computer from the FIG. 8 computer environment.

FIG. 9 is a diagram of the internal structure of a computer (e.g., client processor/device 50 or server computers 60) in the computer system of FIG. 8. Each computer 50, 60 contains system bus 79, where a bus is a set of hardware lines used for data transfer among the components of a computer or processing system. Bus 79 is essentially a shared conduit that connects different elements of a computer system (e.g., processor, disk storage, memory, input/output ports, network ports, etc.) that enables the transfer of information between the elements. Attached to system bus 79 is I/O device interface 82 for connecting various input and output devices (e.g., keyboard, mouse, displays, printers, speakers, etc.) to the computer 50, 60. Network interface 86 allows the computer to connect to various other devices attached to a network (e.g., network 70 of FIG. 8). Memory 90 provides volatile storage for computer software instructions 92 and data 94 used to implement an embodiment of the present invention (e.g. server 115 elements, storage module 125 and GUI 170 detailed above). Disk storage 95 provides non-volatile storage for computer software instructions 92 and data 94 used to implement an embodiment of the present invention. Central processor unit 84 is also attached to system bus 79 and provides for the execution of computer instructions.

In one embodiment, the processor routines 92 and data 94 are a computer program product (generally referenced 92), including a computer readable medium (e.g., a removable storage medium such as one or more DVD-ROM's, CD-ROM's, diskettes, tapes, etc.) that provides at least a portion of the software instructions for the invention system. Computer program product 92 can be installed by any suitable software installation procedure, as is well known in the art. In another embodiment, at least a portion of the software instructions may also be downloaded over a cable, communication and/or wireless connection. In other embodiments, the invention programs are a computer program propagated signal product 107 embodied on a propagated signal on a propagation medium (e.g., a radio wave, an infrared wave, a laser wave, a sound wave, or an electrical wave propagated over a global network such as the Internet, or other network(s)). Such carrier medium or signals provide at least a portion of the software instructions for the present invention routines/program 92.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product 92 is a propagation medium that the computer system 50 may receive and read, such as by receiving the propagation medium and identifying a propagated signal embodied in the propagation medium, as described above for computer program propagated signal product.

Generally speaking, the term "carrier medium" or transient carrier encompasses the foregoing transient signals, propagated signals, propagated medium, storage medium and the like.

Further, the present invention may be implemented in a variety of computer architectures. The computer network of FIGS. 8 and 9 are for purposes of illustration and not limitation of the present invention.

While this invention has been particularly shown and described with references to preferred embodiments thereof, it will be understood by those skilled in the art that various changes in form and details may be made therein without departing from the scope of the invention encompassed by the appended claims.

For example, the present invention provides a universal GUI 170 useable across different devices 105 and device platforms. It is understood that many different devices may be accommodated by the present inventions. Further it is understood that other forms of contents may be employed. Many other methods and systems for delivery of contents are also contemplated herein, the foregoing being for purpose of illustration and not limitation.

What is claimed is:

1. An apparatus, comprising:
a server system communicatively coupled to platform-varied electronic devices associated with a user, wherein a first electronic device of the platform-varied electronic devices has a first platform and a second electronic device of the platform-varied electronic devices has a second platform that is different than the first platform;
the server system including a compatibility system configured to determine whether at least one electronic device of the platform-varied electronic devices supports one or more different possible media contents, based at least in part on a corresponding platform of the at least one electronic device;
the server system configured to accept user requests for distribution service to any of the platform-varied electronic devices, wherein the server system includes a user interface configured to enable user selection of media contents per the platform-varied electronic devices, the user interface indicating at least one of the one or more different possible media contents, wherein the user requests specify the user-desired media content for a target electronic device of the platform-varied electronic devices; and
wherein the server system is configured to enable delivery of a stream or download of the user-desired media content to the target electronic device.

2. The apparatus of claim 1, the server system further comprising:
a registration system configured to register the user requests for distribution service.

3. The apparatus of claim 1, wherein the server system is further configured to enable delivery of the user-desired media content via any one of a high speed digital cable line, a direct satellite connection, a third party satellite connection service, or a global computer network communication.

4. The apparatus of claim 1, wherein the user interface is further configured to indicate music, ring tones, movies, live programs, software programs and applications, radio programs, and other textual, graphical, audio, video and audiovisual contents as possible media contents.

5. The apparatus of claim 1, wherein the server system is further configured to:
search the possible media contents based on a user's prior selections; and
provide search results to the user for user selection.

6. The apparatus of claim 1, wherein the varied electronic devices include digital music players, cellular phones, computers, video players and television.

7. The apparatus of claim 1, wherein the media content is any of music, ring tones, movies, live programs, software programs and applications, radio programs, and other textual, graphical, audio, video and audiovisual contents.

8. The apparatus of claim 1, wherein the server system is further configured to monitor a signal requesting the user interface.

9. The apparatus of claim 1, wherein the user interface is universally useable across the platform-varied electronic devices.

10. The apparatus of claim 1, wherein the server system includes a tracking system to track usage of the user-desired media content.

11. An apparatus, comprising:
a server system communicatively coupled to platform-varied electronic devices associated with a user, wherein a first electronic device of the platform-varied electronic devices has a first platform and a second electronic device of the platform-varied electronic devices has a second platform that is different than the first platform;
the server system configured to determine whether an electronic device of the platform-varied electronic devices supports one or more different possible media contents, based at least in part on a corresponding platform of the electronic device;
the server system configured to accept user requests for distribution service to any of the platform-varied electronic devices, wherein the server system includes a user interface configured to enable user selection of media contents per the platform-varied electronic devices, the user interface indicating at least one of the one or more different possible media contents, wherein the user requests specify the user-desired media content for a target electronic device of the platform-varied electronic devices;
the server system configured to enable delivery of a stream or download of user-desired media content to the target electronic device.

12. The apparatus of claim 11, wherein the server system is further configured to register the user requests for distribution service.

13. The apparatus of claim 11, wherein the server system is further configured to enable delivery of the user-desired media content via any one of a high speed digital cable line, a direct satellite connection, a third party satellite connection service, or a global computer network communication.

14. The apparatus of claim 11, wherein the user interface is further configured to indicate music, ring tones, movies, live programs, software programs and applications, radio programs, and other textual, graphical, audio, video and audiovisual contents as possible media contents.

15. The apparatus of claim 11, wherein the server system is further configured to search the possible media contents based on a user's prior selections; and
the server system further configured to provide search results to the user for user selection.

16. The apparatus of claim 11, wherein the varied electronic devices include digital music players, cellular phones, computers, video players and television.

17. The apparatus of claim 11, wherein the media content is any of music, ring tones, movies, live programs, software programs and applications, radio programs, and other textual, graphical, audio, video and audiovisual contents.

18. The apparatus of claim 11, wherein the server system is further configured to monitor a signal requesting the user interface.

19. The apparatus of claim 11, wherein the user interface is universally useable across the platform-varied electronic devices.

20. The apparatus of claim 11, wherein the server system is further configured to track usage of the user-desired media content.

* * * * *